United States Patent Office 2,847,243
Patented Aug. 12, 1958

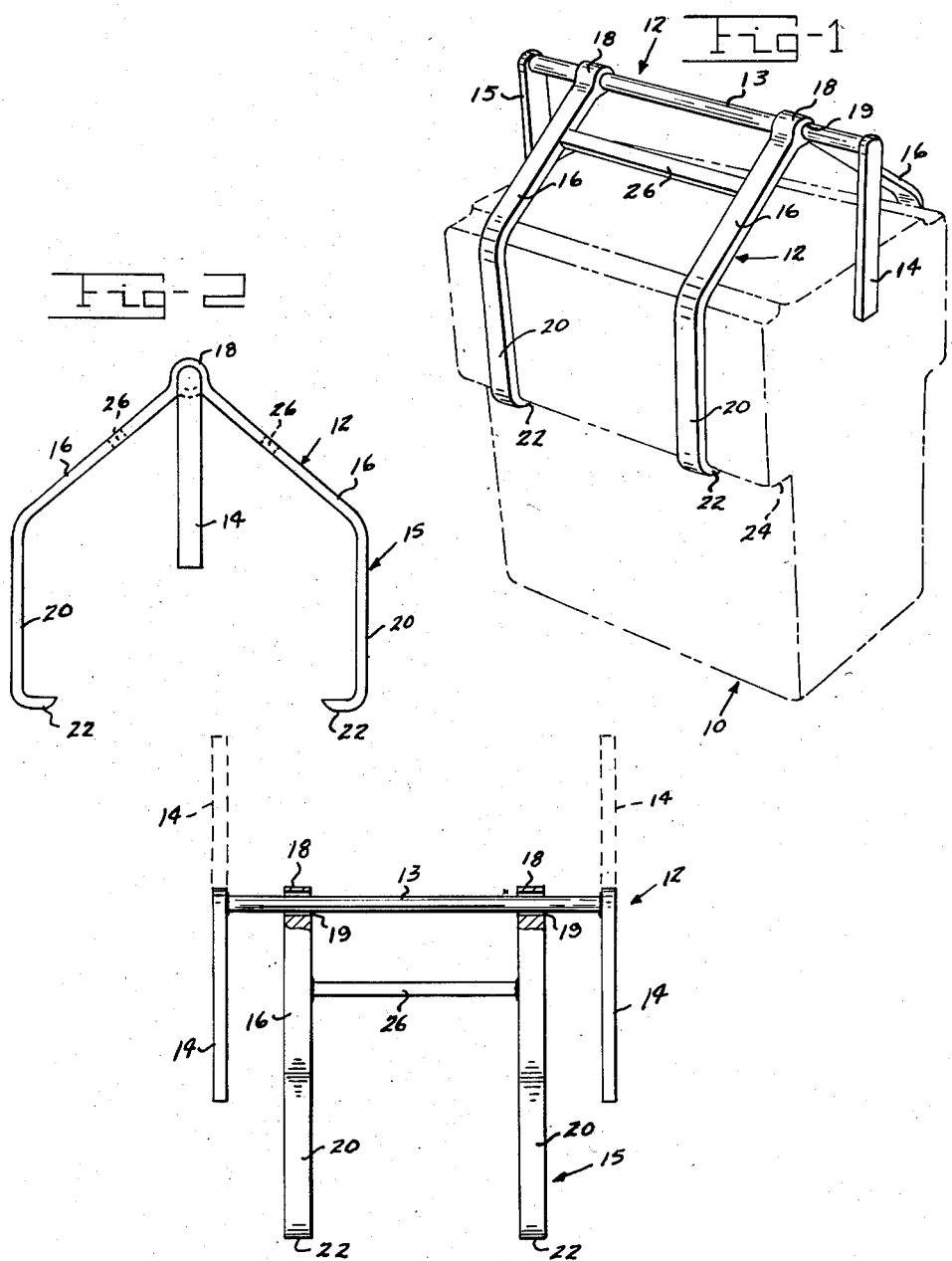

2,847,243

BATTERY LIFTER

Aaron H. Hare, Amarillo, Tex.

Application July 10, 1956, Serial No. 597,053

6 Claims. (Cl. 294—16)

(Granted under Title 35, U. S. Code (1952), sec. 266)

The invention described herein may be manufactured and used by or for the United States Government for governmental purposes without payment to me of any royalty thereon.

This invention relates to battery lifters and carriers, and more particularly, to carriers for aircraft batteries of the K-1 type which comprise a rectangular case with an overhanging ledge along opposite sides.

Many types of battery carriers have been proposed to solve the problem of manually handling and installing batteries in situations where mechanical aid is unavailable or undesirable.

Permanently attached handles cannot be provided. This is precluded by the nature and uses of the battery itself which require substantially plane uninterrupted wall surfaces. There is constant danger of slipping of an insecurely held battery, with the accompanying damage to the battery and other property, and injury to personnel including severe corrosive acid burns.

The object of the present invention is the provision of a device for lifting and moving batteries where mechanical aid is unavailable or undesirable.

A further object of the invention is the provision of a battery carrier which is extremely simple in construction and in operation, is easily secured to the battery, firmly attached while the battery is being transported and is easily detached when the operation has been completed.

A further object of the invention is the elimination of waste motion and danger of damage to property and injury to personnel.

A further object of the invention is the provision of positive means for grasping and transporting handleless articles, said means being safe, easily engageable and easily released.

A further object of the invention is the provision of a battery carrier which is applied to and released from the battery by sliding motion.

Further objects and advantages will appear as the description proceeds.

In the drawing,

Fig. 1 is a perspective view of the battery carrier secured to a battery and in carrying position, the battery being shown in phantom.

Fig. 2 is an end elevation of the carrier shown in Fig. 1 with the battery omitted.

Fig. 3 is a side elevation with portions broken away showing the carrier in carrying position and also showing the release positions in dotted lines.

Referring more particularly to the drawings, an article to be carried is shown at 10 in Fig. 1. In the specific showing, this article is a K-1 type battery, i. e., a battery or any other article which has an overhanging ledge capable of being grasped. It is to be understood that the carrier is adaptable for lifting and carrying other types of handleless articles.

The carrier is characterized by its simplicity of construction. It is composed of a frame member indicated generally by the numeral 12, the handle 13 and stop members 14. The frame 12 comprises one or more straplike grasping elements 15 having a pair of portions 16 extending from each other at an angle of the order of 60°, and provided at their meeting apex with a bearing member 18 having a bearing orifice 19 extending transversely therethrough. The straplike elements 16 extend downwardly into a pair of parallel segments 20 which, in operation, lie along the upper vertical surfaces of a battery when applied thereto, and from thence are bent inwardly at an angle of not less than 90° to form the hook-like segments 22. In operation, the segments 22 lie beneath the overhanging ledge 24 of a K-1 type battery, or any article having an overhanging ledge, or can be adapted to lie beneath the undersurface of a box or other rectangular container.

The members 16 are attached together by means of a brace member 26. The handle 13 comprises a rod circular in cross section. The rod 13 passes through the openings 19 and is journaled in the members 18. The engagement is such as to allow free rotation of the member 13. The handle 13 is provided at each end with a stop member 14, rigidly attached to each end and extending radially at right angles to the end, and parallel to each other.

The operation of the device is as follows: When the battery or other article is to be lifted, the stop members 26 are swung upwardly into the position shown in dotted lines in Fig. 3. The frame member 12 is slid longitudinally onto the battery, with the members 22 lying below the overhanging ledge 24 of the battery, or engaging the lower surface of a box or other rectangular container. When the frame is in proper position, the handle 13 is rotated so that the stop members 14 assume the position shown in Figs. 1 and 2 and lie along the ends of the battery or box. When the battery is lifted, the frictional engagement between the surface of the handle 13 and the bearing orifice 18 is increased by the weight of the battery. The rotation and consequent displacement of the stop 14 are thus prevented. Within the scope of the invention, one wide strap or grasping member, or a plurality, may be used. As shown in the drawing, two such members are braced by a pair of braces 26. It will thus be seen that sliding movement of the article being carried is effectively prevented by the stops 14.

While the invention is shown and described in connection with one form for illustration, rather than restrictive purposes, it is obvious that minor changes and modifications may be made by those skilled in the art without departing from the scope and spirit of the invention as defined in the accompanying claims.

I claim:

1. An article carrier comprising a rod-like handle member adapted to extend in article carrying position horizontally and a distance above the article being carried, a pair of article grasping elements journalling said handle member for rotation therein, each of said grasping elements comprising segments extending immovably outwardly and downwardly from the journal in a direction at an angle to the vertical, parallel sections adapted to lie at opposite vertical edges of an article to be carried, and a pair of inwardly directed sections insertable beneath the shoulder ledge of a battery or beneath the lower edges of any rectangular container, a pair of braces connecting the analogous angularly directed segments of one grasping member to the analogous angularly directed segments of the other grasping member, stop members rigidly attached to the ends of said rod member extending normally and radially therefrom and rotatable therewith, for selectively allowing or preventing relative sliding movement in either direction of an article being grasped.

2. A frame for lifting and transporting batteries comprising a pair of rigidly connected grasping elements adapted for sliding engagement with the opposite overhanging ledges of a battery or other article, braces for spacing and stabilizing the elements of said frame, bearings in said frame positioned to be above the battery being carried, a bar member serving as a handle extending through said bearings, a stop member on each end of said bar, said stop members being capable of selective positioning either in contact with the ends of the battery to hold it against sliding motion or out of contact therewith to allow sliding and release of said battery from said grasping elements, said change of position being effected by the rotation of said stop members about said bar as a center.

3. A battery lifter comprising a grasping frame adapted for sliding engagement with an overhanging ledge or bottom edges of a battery or other rectangular article, a pair of bearing members in said frame located to be in alignment and above the article to be carried, a rod member constituting a handle journaled in said bearings for rotating movement, a stop member rigidly attached to each end of said rod members and extending normally and radially therefrom, said stop members rotating with said rod member into and out of stopping position, to selectively allow or prevent sliding movement of said grasping members relative to said battery.

4. In an article lifter and carrier a rigid carrying frame, comprising grasping means, axially aligned bearing members on said grasping means, located to be above an article to be carried, a rod constituting a handle mounted in said bearing members for rotation relative thereto, a stop member rigidly mounted on each end of said rod for rotation with it for selective positioning to permit or prevent sliding movement of said grasping means relative to an article being grasped, said grasping means having integral portions extending downwardly at an angle to the vertical and parallel portions for fitting the vertical sides of an article to be held and inwardly directed portions vertical to said parallel portions for engaging the overhanging shoulders or bottom edges of a battery or shoulders or bottom edges of other articles.

5. An article lifter and carrier comprising a grasping frame, axially aligned bearing members located to be positioned above an article to be carried, a rod constituting a handle mounted in said bearing members for rotation relative thereto, a radially extending stop member rigidly mounted on each end of said rod for rotation with it for selected positioning to permit or prevent sliding movement of said grasping means relative to an article being grasped, said grasping means having parallel portions for fitting the vertical sides of an article to be held and inwardly directed portions vertical to said parallel portions for engaging the overhanging shoulders of a battery or shoulders or bottom edges of other articles.

6. In an article carrier, a pair of members each provided with means for slidably engaging opposite overhanging ledges or the opposite bottom edges of an article to be carried, a rodlike handle journaled in each of said pair of members, the point of journal being positioned a distance above the article being carried, stop means rigidly connected to each end of said handle member and rotatable therewith for selectively allowing or preventing relative sliding movement of said members and said article.

References Cited in the file of this patent
UNITED STATES PATENTS

| | | |
|---|---|---|
| 884,434 | Wolgamott | Apr. 14, 1908 |
| 1,857,598 | Longaker | May 10, 1932 |
| 2,377,845 | Westfall | June 5, 1945 |
| 2,429,193 | Pool et al. | Oct. 14, 1947 |